United States Patent
Delattre et al.

(10) Patent No.: US 6,606,302 B2
(45) Date of Patent: *Aug. 12, 2003

(54) METHOD FOR THE CONTROL OF FLOWS WITHIN AN ATM SWITCH WITH DISTRIBUTED ARCHITECTURE

(75) Inventors: Michel Delattre, Boulogne (FR); Marc Bavant, Paris (FR); Didier Guerin, Garancieres (FR); Philippe Herau, Malakoff (FR)

(73) Assignee: Thomson-CSF, Paris (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/175,478

(22) Filed: Oct. 20, 1998

(65) Prior Publication Data

US 2002/0145977 A1 Oct. 10, 2002

(30) Foreign Application Priority Data

Oct. 20, 1997 (FR) ............................................ 97 13100

(51) Int. Cl.⁷ .............................................. H04L 12/56
(52) U.S. Cl. ................................ 370/230.1; 370/395.43
(58) Field of Search ................................. 370/229, 230, 370/235, 389, 395, 396, 398, 399, 409, 413, 414, 415, 416, 462, 465, 468, 471, 230.1, 232, 233, 234, 395.1, 395.3, 395.5, 395.52, 395.53, 905, 395.43

(56) References Cited

U.S. PATENT DOCUMENTS

| | | | |
|---|---|---|---|
| 5,719,865 A | * 2/1998 | Sato | 370/395 |
| 5,796,719 A | * 8/1998 | Peris et al. | 370/231 |
| 5,850,399 A | * 12/1998 | Ganmukhi et al. | 370/412 |
| 6,023,468 A | * 2/2000 | Mouen-Makoua et al. | 370/395 |
| 6,052,375 A | * 4/2000 | Bass et al. | 370/412 |
| 6,081,507 A | * 6/2000 | Chao et al. | 370/235 |
| 6,097,701 A | * 8/2000 | Grunenfelder et al. | 370/235 |
| 6,144,978 A | 11/2000 | Bavant | |
| 6,157,614 A | * 12/2000 | Pasternak et al. | 370/236 |
| 6,163,542 A | * 12/2000 | Carr et al. | 370/399 |
| 6,185,188 B1 | * 2/2001 | Hasegawa | 370/235 |
| 6,198,723 B1 | * 3/2001 | Parruck et al. | 370/230 |
| 6,240,066 B1 | * 5/2001 | Nagarajan et al. | 370/230 |
| 6,262,989 B1 | * 7/2001 | Gemar et al. | 370/412 |

FOREIGN PATENT DOCUMENTS

EP 0 772 325 A2 5/1997

OTHER PUBLICATIONS

A. Hagai and B. Patt–Shamir. Multiple Priority, Per Flow, Dual GCRA Rate Controller for ATM Switches. 2001 IEEE. pp. 169–174.*

Brian L. Mark, et al., "Large Capacity Multiclass ATM Core Switch Architecture", ISS '97. XVI World Telecommunications Congress Proceedings, Toronto, Sep. 21–26, 1997, vol. 1, Sep. 21, 1997, pp. 417–423.

Uwe Briem, et al., "Traffic Control For An ATM Switch with Per VC Queuing: Concept and Implementation", ISS '97, XVI World Telecommunications Congress Proceedings, Toronto, Sep. 21–26, 1997, vol. 1, Sep. 21, 1997, pp. 409–415.

* cited by examiner

Primary Examiner—Melvin Marcelo
(74) Attorney, Agent, or Firm—Oblon, Spivak, McClelland, Maier & Neustadt, P.C.

(57) ABSTRACT

A method for the control of flows particularly within an ATM switch transmission network with a distributed architecture. The method distributes a specified number n of shapers to each input line card, a specific shaper being dedicated to the VBRnrt (Variable Bit Rate non real time) category flows as a function of the totalized mean bit rate, and n−1 other shapers being adjusted as a function of the available bit rate (AVCR) of the output ports.

16 Claims, 7 Drawing Sheets

FIG.5b — PIP TOKEN BROADCAST (LIST) TO $t_0$

FIG.5c — SPEECH TOKEN BY CLASS TO $t < t_0 + T_1 + T_2$

FIG.5d — COLLECTION TOKEN RELAYED TO $t > t_0 + T_1 + T_2$

| | WITHOUT SHORT-CIRCUIT | WITH SHORT-CIRCUIT |
|---|---|---|
| LINE CARD 1, INPUT | VLA 1 → VLA'1, LG | VLA 1 → VLM, L1, L2, L3 |
| LINE CARD 1, OUTPUT | VLM → VLM1, P1 | DITTO |
| LINE CARD 2, INPUT | VLA 21 → VLA'21, LG<br>VLA 22 → VLA'22, LG | VLA 21 → VLM, L1, L2, L3<br>VLA 22 → VLM, L1, L2, L3 |
| LINE CARD 2, OUTPUT | VLM → (VLM 21, P21)<br>(VLM 22, P22) | DITTO |
| LINE CARD 3, INPUT | VLA 3 → VLA'3, LG | VLA 3 → VLM, L1, L2, L3 |
| LINE CARD 3, OUTPUT | VLM → VLM3, P3 | DITTO |

FIG.6d

METHOD FOR THE CONTROL OF FLOWS WITHIN AN ATM SWITCH WITH DISTRIBUTED ARCHITECTURE

BACKGROUND OF THE INVENTION

1. Field of the Invention

The present invention relates to a method for the control of flows for point-to-point, point-to-multipoint, multipoint-to-point and multipoint-to-multipoint non-real time connections within an ATM switch with distributed architecture and storage at input.

2. Discussion of the Background

The communication networks known as ATM or asynchronous transfer mode networks enable the circulation of fixed length packets known as ATM cells consisting of a 5-byte header and a 48-byte body. The header contains in particular a logic channel identifier known as a VPI/VCI (or virtual path identification and virtual channel identifier) field that enables the routing of the cells in the switches that it encounters on its path between the sender user and the addressee user.

The applications capable of using ATM networks for the communication of their data are highly varied. Most of the applications capable of using ATM networks have their own format for their data elements: these may be for example IP format frames of the Internet protocol or else frames using the format of the MPEG (moving picture export group) format. The adaptation between the format of these application frames and the format of the ATM cells is done in a layer called an ATM adaptation layer or AAL. In particular, this layer is responsible for segmenting the frames into cells and conversely reassembling the cells received from the network into frames.

Some of the data flows conveyed, known as "real time flows" require that the transit time and the jitter to which the network subjects their cells should be the minimum. This case relates for example to telephone data. Other data flows, hereinafter called non-real time flows, for example electronic mail, do not have these constraints. The real time flows must benefit from a certain degree of priority within the network and, for this purpose, they are subjected to a preventive congestion control mechanism by means of the reservation of resources.

Several major classes of flows known as "service categories" are defined in the standards ([UIT-T.I.371], [AF TM4.0]) to take account of the different demands that users may make as regards the quality of the service that they seek for a desired flow, defined by service quality parameters such as: cell loss rate, transfer time, jitter, minimum bit rate, etc. and to take account of the different characteristics of the bit rate of this flow, formed by traffic parameters such as peak bit rate, mean bit rate, maximum size of a burst, etc.

The real-time flow comes within one of the categories known as CBR (constant bit rate) or VBRrt (variable bit rate—real time). The non-real-time flows come within one of the following categories known as UBR (unspecified bit rate) whose service quality is not the object of any requirement on the part of the user, VBRnrt (variable bit rate—non-real-time) whose statistical characteristics are known with sufficient precision to enable a guarantee with respect to the loss rate or available bit rate (ABR) for which a minimum bit rate is guaranteed or a low loss rate as a trade-off for an end-to-end flow control according to the indications of the network.

Figure 1A:
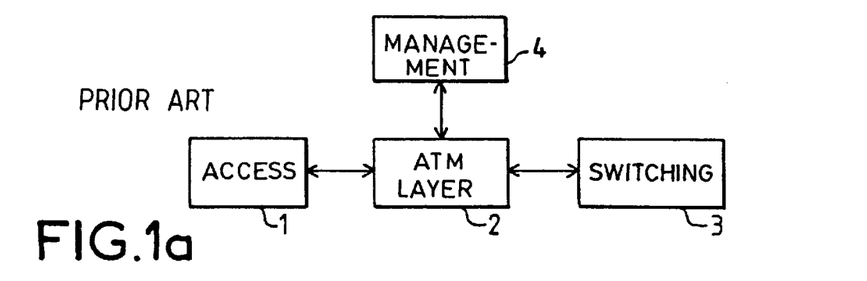
FIG. 1a is a drawing showing the principle of an ATM switch according to the invention.

Any ATM switch, in the manner shown in FIG. 1a, implements four major sets of functions, an access function 1 to each port of an ATM switch, an ATM layer function 2, a switch fabric function 3 and a management function 4.

The access function 1 provides for the conversion of the ATM cells into the format that is suited to the transmission medium connected to said port and vice versa. This function makes it possible to present incoming cells to the ATM layer in a single format that is independent of the bit rate and the optical, electrical, radio or other type of technology of the transmission medium from which they come. The ports of a switch enable the connection of several switches together but they also enable the connection of a user of ATM services to a switch.

The processing operations to be implemented in the access function are described in a huge volume of standard-setting literature on the ANSI as well as the UIT and ATM Forum systems. The major classes of interface defined in these documents are:

The PDH (plesiochronous digital hierarchy) interface defined in the document UIT-T G.804, G.703.

The SDH (synchronous digital hierarchy) interface defined in the document UIT-T G.708, etc.

The SONET (synchronous optical network) interface defined in the document ANSI-T 1.105, etc.

The 25.6 Mbit/s IBM interface defined in the document af-phy-0040.000.

The ATM layer function 2 combines several functions and especially the management of the cell headers, the translation of the VPI/VCI (virtual path identification and virtual channel identifier) logic channels, the processing of the OAM (operations, administration and maintenance) management cells, a major part of the management of the traffic known as traffic management including sub-functions known as UPC (usage parameter control), SCD (selective cell discard), EPD (early PDU discard), RM (resource management) cells, etc.

The processing operations to be implemented in the ATM layer function are described especially in the following standard documents of the UIT and the ATM Forum:

B-ISDN ATN Layer Specification [UIT-T I.361]

B-ISDN Operation and Maintenance Principles and Functions [UIT-T I.610]

Traffic Management Specification Version 4.0 [AF-TM 4.0]

The switching or scrambling function 3 switches the cells from an input direction to one or more output directions, as a function of indications prepared by the ATM layer during the translation of the logic channels.

The management function 4 includes sub-functions such as: the local supervision of the switch (alarms, discovery of the configuration of the switch and of the local topology, management of versions, etc.), interfacing with the centralized supervision entity of the network, the interfacing needed to set up switched virtual circuits, etc.

For a more detailed description of some of these sub-functions, reference will be made to the standard-setting literature of the ATM Forum:

ATM User-Network Interface (UNI) Signalling Specification Version 4.0 (af-sig-0061.000)

Private Network-Network Interface Specification Version 1.0 (af-pnni-0055.000)

Integrated Layer Management Interface (af-ilmi-0065.000)

These different functions are mutually interfaced as indicated here below. It must be noted that the management function behaves exactly like a user except that its connection to the ATM layer does not go through an external port of the switch and therefore does not require any access function. By contrast, the management function does process ATM cells alone but also messages which it must therefore segment and reassemble by means of an AAL (ATM adaptation layer) which is therefore an additional function: the adaptation function.

The ATM switches are often switches with centralized architecture or weakly distributed architecture, that is to say the functions of the switch itself are performed by a single hardware element that combines computation capacities formed by microprocessors, storage capacities formed by memories and capacities for routing the cells in the switch fabric. However, this concentration adversely affects the modular nature of the switch and its ability to remain functional when one of its constituent elements goes out of order.

According to a standard solution, the functions are distributed among distinct hardware elements that may, if necessary, be doubled to enable the pack-up of a faulty element of the same nature. These hardware elements are installed in the switch in sufficient numbers to cope with the processing load that is foreseeable as a function of the configuration of the network at this place. In practice, these elements are electronic component boards assembled in a tray and interfacing with one another by means of one or more data buses placed at the bottom of the tray. They define what is common called a "distributed architecture".

Figure 1B:
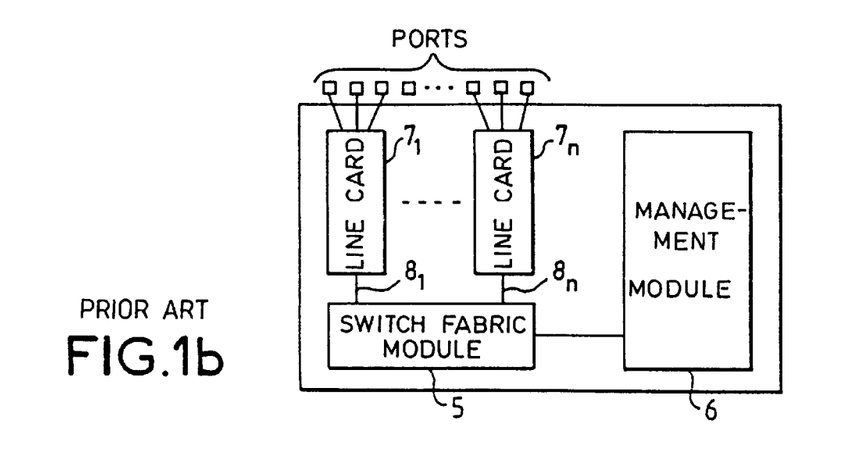
FIG. 1b is a drawing showing the principle of an ATM switch with distributed architecture according to the prior art.

Conventionally, the hardware architecture of a distributed ATM switch, as can be seen in FIG. 1$b$, distinguishes between three types of modules: a switch fabric module 5, a management module 6 and line card modules $7_1 \ldots 7_n$. The functions of the switch are distributed over these different modules with, however, the constraint wherein the line card modules deal at least with the access function, the switch fabric module 5 with the scrambling function and the management module 6 with the management function.

In FIG. 1$b$, the links $8_1 \ldots 8_n$ existing between each line card module and the scrambling module are called "switch fabric junctions". Furthermore, each line card module implements an access function capable of managing one or more ports. When a cell goes through a switch, it begins by crossing a first line card called an input line card for the cell and then a second line card called an output line card. Since several input line cards may simultaneously send cells towards one and the same output line card, there may be congestion in the cells owing to the limited output bit rate of this output line card. Mechanisms for storing the cells and placing them in queues are then activated, pending the clearing of the congestion. These storage mechanisms may be found at the input or the output, in the switch fabric or in several of these elements at the same time. The term used is then architecture with "storage at input", "storage at output", etc.

The users of a communications network may envisage several modes of exchange of their data elements. These data elements are shown schematically in FIGS. 2$a$ to 2$f$. The point-to-point mode shown in FIG. 2$a$ links up two users A, D exclusively. Each of them may be a transmitter and a receiver. In this mode, all that is sent by one of the users is received by the other user. One variant of the point-to-point mode can specialize the sender and receiver roles of each of the two users (one-way point-to-point communications).

Figure 2A:
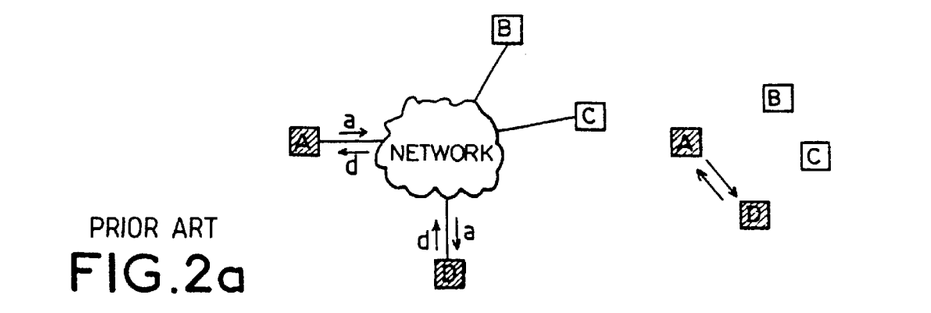
FIGS. 2a to 2f are drawings showing modes of communication between users of an ATM network.
Figure 2B:
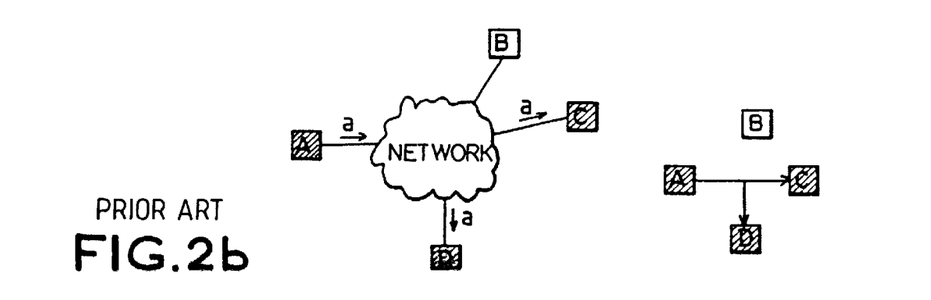

The point-to-multipoint mode (FIG. 2$b$) links up more than two users, A, C, D, one of whom is exclusively a sender while the others are exclusively receivers. All that is sent by the sender is received by all the receivers.

Figure 2C:
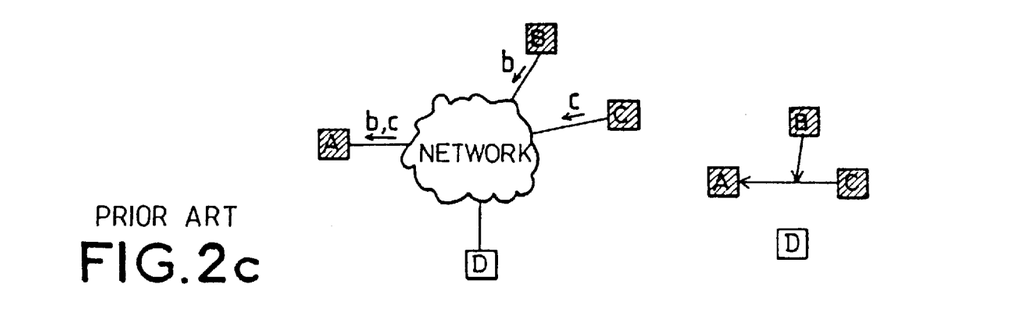

The multipoint-to-point mode (FIG. 2$c$) also links up more than two users A, B, C one of whom is exclusively a receiver while the others are exclusively senders. All that has sent by one of the senders is received by the receiver.

Figure 2D:
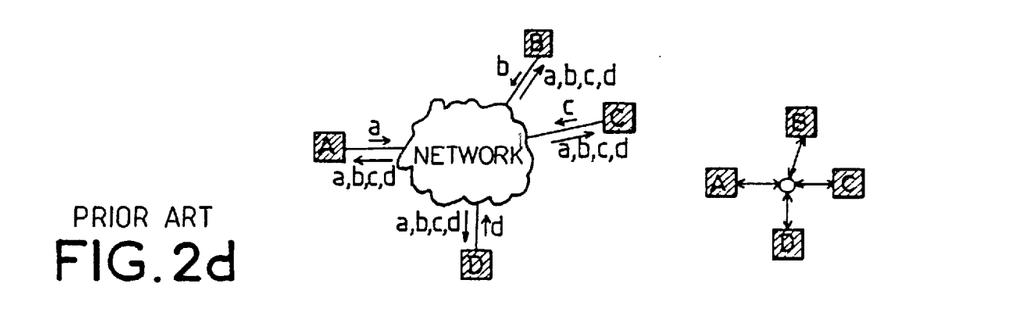
Figure 2E:
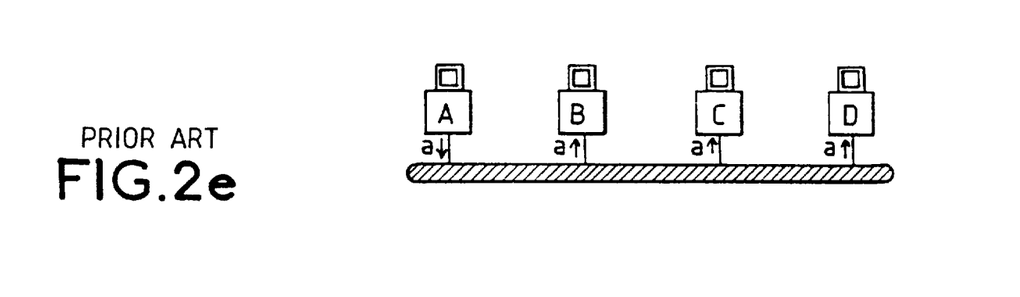
Figure 2F:
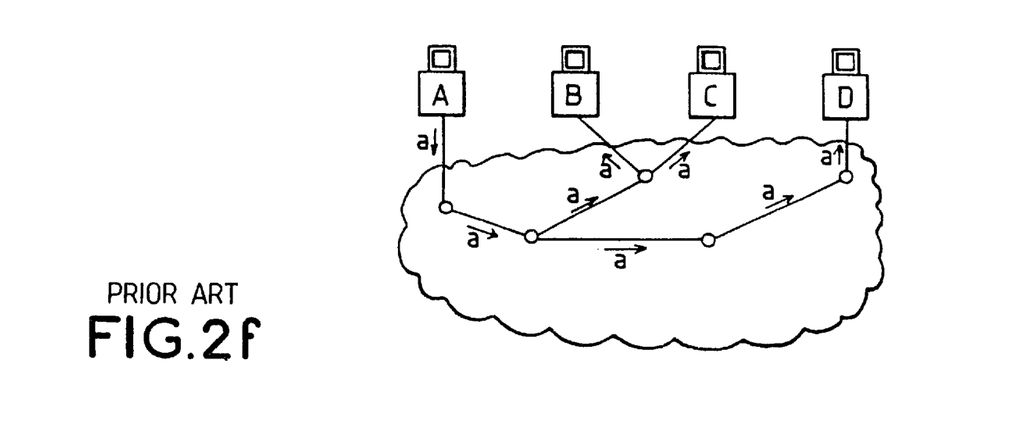

Finally, the multipoint-to-multipoint mode (FIG. 2$d$) links up at least two users A, B, C, D each capable of being a sender and a receiver. In this last-named mode, all that has been sent by any one of the users is received by all the other users and also by the sender.

The multipoint-to-multipoint communications and the point-to-multipoint communications are especially natural in the case of a shared medium communications network such as the Ethernet network shown schematically in FIG. 2$e$. Indeed, in this case, all the users are connected to a single medium and all the connected stations A, B, C, D connected to this medium receive all the messages sent by the other stations. On the contrary, in the case of an ATM network as shown schematically in FIG. 2$f$, the distribution, to several addressees A, B, C, D, of a cell sent by one of the users requires that the network should itself generate copies of the cell in question.

The term 'connection' is applied to any communication according to one of the modes defined here above, between a well-defined set of users, this communication being endowed with a specific list of attributes such as: service quality parameters, traffic parameters, etc.

The implementation, within an ATM network, of communications in the different modes defined here above may be seen from several points of view, in particular signalling, routing, conveying of data elements and management of resources.

With regard to point-to-point connections, the signalling and routing aspects are extensively described in the documents ([UIT-T Q.2931], [AF-SIG 4.0], [AF-PNNI1.0], [AF-IISP]) of the standard-setting literature.

These aspects include the determining, in the network, of a path between the two users such that this path meets the constraints of service quality and traffic of the connection. The path is formed by a list of arteries. Each switch of the path assigns the connection a logic channel number pertaining to the input artery of the connection into the switch and maintains a translation table which, for this identifier, obtains a correspondence between the outgoing direction that the cell must take and the logic channel identifier of the connection in the next switch. Thus, every cell of the connection may be routed from one point to the next solely by consulting the logic channel identifier present in the cell header and the local translation table.

In a distributed architecture switch, such as the one of FIG. 1$b$, this translation can be done by the ATM layer function of the input line card. The cell is then handed over to the switch fabric module with an indication of the output switch fabric junction towards which the switch fabric must switch the cell. This indication may be conveyed by a specific header added to the beginning of the cell. Translation devices in accordance with this example have been described by the Applicant, for example in the French patent applications Nos. 2 670 972, 2 681 164, 2 726 669, and the as yet unpublished patent application FR 97 07355.

With regard to the resource management aspect, several cases are possible depending on the service category of the connection.

The real-time flows, namely the CBR and VBRrt connections, are subjected to a preventive reservation of resources. The probability of congestion of an output line card because of real-time flows is therefore low. Thus, it is generally not necessary to plan for storage memories at input. By contrast, a small-sized output storage memory is necessary to absorb cells coming simultaneously from several entries.

The non-real-time flows with guarantee of service quality, namely the VBRnrt or ABR connections, can be subjected to certain measures of preventive reservation, but these measures are insufficient given the highly sporadic nature of the VBRnrt sources and the tendency of the ABR sources to occupy the entire available bandwidth. For these flows, it is therefore necessary to provide for temporary storage memories, given that this type of flow, by its statistical nature for the VBRnrt connections or by its end-to-end flow control for the ABR connections, ensures that the total bit rate of the sources remains on an average smaller than or equal to the available bit rate.

For the non-real time flows without guarantee of service quality, namely the UBR connections, no preventive mechanism is possible. It is therefore necessary to provide also for storage memories and share this space between the different connections in preventing one connection from taking up too much available space (in accordance with the notion of fairness). It is also necessary to prevent a situation where the processing of the UBR connections could hamper the running of flows with guaranteed service quality.

This last-named point acquires all its importance through the fact that most of the existing ATM switches set up a pooling of resources between all types of flows. This is especially true with respect to scrambling capacities. However, it is also the case with storage capacities for it is not advantageous to segment the available memory as a function of the service category. It is therefore up to the switch to implement a flow control mechanism making it possible to prevent any congestion downline (the output line card applies retroactive rules to the input line cards to regulate their bit rate). This mechanism that should not hamper the flows with guaranteed service quality. Furthermore, since this mechanism tends to shift the downline congestion upline, it is up to the traffic management function, which is a sub-function of the ATM layer function, to reject cells that violate the policy upline storage resources allocation.

The French patent application No. 2 740 283 on behalf of the present Applicant presents an example of a flow control mechanism of this kind in FIG. 1. With this basic mechanism, there are often associated complementary mechanisms for the elimination of "head-of-line blocking" based on specific queues in the input memory as a function of the outgoing junction. In practice, these mechanisms prove to be almost indispensable with regard to guaranteed service quality flows. Various examples of such mechanisms are presented and referred to in M. HYOJEONG SONG, "A simple and fast scheduler for input queued ATM switches", in HPC ASIA 97.

Symbolically, the point-to-multipoint connections may be represented by a "tree" with a "root" representing the sender user and its "leaves" representing the receiver users. The implementation of connections of this type is standardized as regards signalling and the routing. What has to be done simply is to form a point-to-multipoint connection by creating first of all a point-to-point connection and then grafting new leaves on it. This addition of leaves may be done at the initiative of the root or else of the leaf.

Figure 3A:
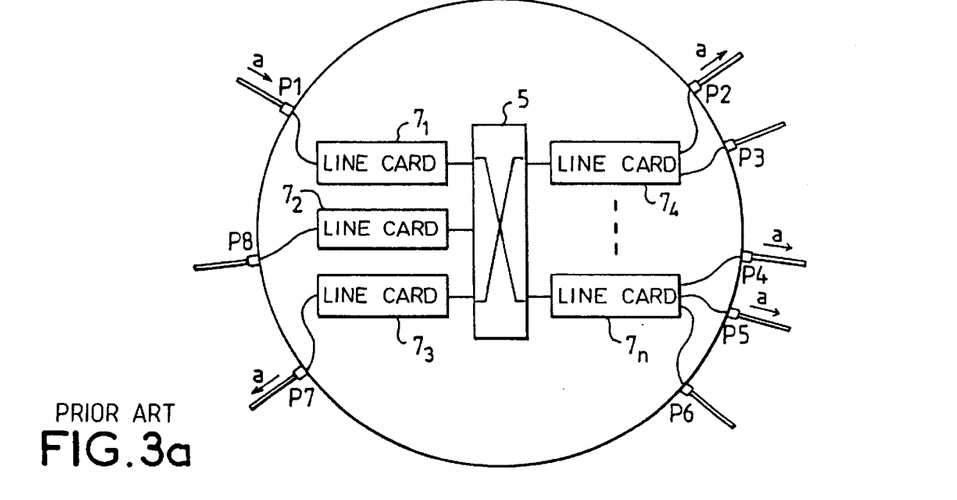
FIG. 3a shows an example of a routing of an ATM cell in a switch during a point-to-multipoint connection.

With regard to the conveyance of the cells, the point-to-point connection model, namely the input translation alone, cannot always be applied. FIG. 3a, where the elements similar to those of FIG. 1b are identified with the same references, shows a point-to-multipoint connection. This connection enters the switch by a port P1 and exits therefrom by the ports P2, P4, P5, P7. In this case, the input translation envisaged further above may order the switch fabric 5 to copy each cell of this connection into the three switch fabric junctions ($7_3$, $7_4$, $7_n$) concerned but it is not capable of indicating the output ports to which the cell must be sent. To do so, it is necessary to add this information into the translation tables and send it from the input up to the output. Furthermore, the output logic channel depends on each output port and it is not possible to assign a single logic channel to all the outputs.

For these reasons, it is generally preferred to make a twofold translation: an input translation which replaces the logic channel of the cell by a <<broadcasting index>> representing the connection within the switch, and then a second output translation which expresses the broadcasting index into a list of pairs of the form 'port, logic channel' with the copies that may be necessary.

With regard to the management of resources for the non-real-time flows, on the contrary, it is difficult to hope for a simple extension of mechanisms for the control of flows implemented for the point-to-point connections. Indeed, the head-of-line blocking mechanisms, making use of queues specific to each output, would dictate the management of as many queues as there are possible sets of outputs, namely $2^N\_1$ in the case of N switch fabric junctions.

Another solution may include, for example, making as many copies of each cell in the input line card as there are output line cards concerned by this cell. This approach would have the unacceptable drawback of requiring N switch fabric cycles to transmit a cell to N output junctions, while the technology of the switch fabric generally enables the transfer of the cell towards N outputs in a single cycle.

By contrast, the French patent application No. 2 740 283 referred here above describes a single solution based on the local conversion of the different point-to-multipoint UBR/ABR flows into a single point-to-multipoint CBR flow by separating the transmissions and letting them through one by one from the input line card to the switch fabric and by means of an outright fixed-value reservation of the resources on all the output ports, the reservation level being fixed according to the bit rate dictated by a separating device known as a shaper.

However, this approach has drawbacks when the output ports have bit rates that are very different from one another. This is easily the case in an ATM switch where 25 Mbit/s ports can coexist with 622 Mbit/s ports. Indeed, in this case, it will be necessary to adjust the bit rate of the shaper on the basis of the bit rate of the port with the smallest bit rate. Since all the ABR/UBR connections use the same shaper, the result thereof is a choking of all the connections, even of the connections that take only high bit rate output ports.

The multipoint-to-point and multipoint-to-multipoint connections are not presently being processed in the standardization units that deal with the ATM. There is therefore, for the time being, no signalling or routing defined for this type of connection.

In terms of the conveyance of the cells, any topology of communication leading data elements of different geographical origins to converge on one and the same link raises what is called the problem of the 'interlacing of PDU (protocol data unit) application frames'. Indeed, since the PDU application frames are segmented by the AAL layer into cells, the cells of different frames reach the addressee in an interlaced from. To reassemble the frames, the addressee should be capable of finding the frame to which each cell belongs. Now the segmenting mechanism most commonly used in the UBR connections, implemented in the AAL 5 adaptation layer, do not enable this identification. It enables only the identification of the last cell of the PDU frame, which is sufficient in point-to-point or point-to-multipoint modes for the ATM cells are transmitted in sequences.

For the switches with centralized architecture or with storage at output, it is possible to be satisfied with an approach that keeps the cells of one and the same PDU frame in the memory, and sends them all together when the PDU frame has been completely received. This is not the case for switches with input storage for the simultaneous access to the switch fabric shared by the different input line cards necessarily introduces another interlacing if the transmission from the different line cards is not coordinated.

Figure 3B:
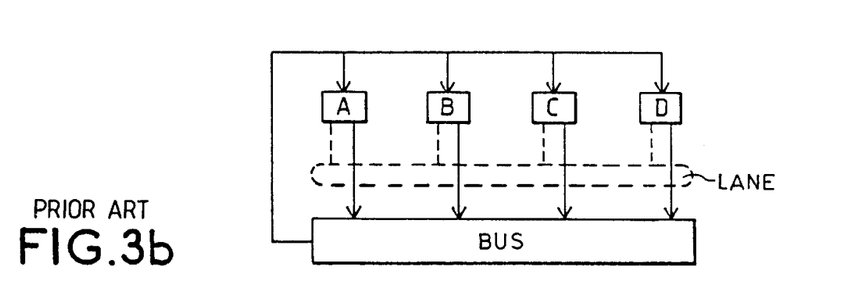
FIG. 3b shows an example of the superimposing of point-to-point connections or point-to-multipoint connections in an emulated LAN architecture.

Despite all these problems, there are existing needs of communications in multipoint-to-point and multipoint-to-multipoint modes. They could be dealt with in theory by the superimposition of point-to-point communications or point-to-multipoint communications. This case has appeared especially in the context of the emulation of local area networks known as LAN Emulation or LANE (local array network emulation) where any sophisticated mechanism is installed to emulate a shared medium (ELAN) within an ATM network [AF LANE]. An example that may be referred to is that of a server known as a BUS (broadcast or unknown server) which is defined in the LANE standard. This server, whose architecture is shown in FIG. 3b, enables a user to broadcast messages to all the users of an emulated shared medium or towards another user with whom he is not directly connected. Each user of the ELAN has a point-to-point connection towards the BUS server and the BUS server has a point-to-multipoint connection towards all the users of the ELAN, as indicated in FIG. 3b. In the prior art, the broadcasting servers of the BUS server type are implemented either by an expensive dedicated piece of hardware connected somewhere to the ATM network or by a specific process that is executed on the management module of the switch. This last-named approach unfortunately is not greatly extensible when the number of users of the ELAN increases. Indeed, during the period of time when a new user is not known to his partners, the messages that he sends and receives must go through the BUS server. This is often a cause of congestion that may be fatal to the management module.

Another example of a need for multipoint-to-point communications and multipoint-to-multipoint connections is given by the emulation of routing between local area networks. This function in particular may be implemented according to the norm known as MPOA (multiprotocol over ATM) of the ATM Forum which makes it possible to obtain virtual routing between different emulated local networks (ELANs) or different virtual local area networks (VLANs) of an ELAN [AF MPOA]. Another way of obtaining the emulation of the routing consists in installing a routing software program in the management unit of the ATM switch. In this context, a virtual router can be likened a user of the different ELANs that it interconnects. On this basis, it must house a function, known as a LEC (LAN emulation client) for each ELAN. The virtual router must be implemented in a switch, for example by a specific process that is executed in the management module. This entails the risk of causing congestion in said module when the exchanges between the ELANs reach a sufficiently sustained level.

SUMMARY OF THE INVENTION

To this end, an object of the invention is a method for the control of flows within an ATM switch with distributed architecture and storage at input, wherein the method distributes, to each input line card, a specified number n of shapers, a shaper being dedicated to the VBRnrt (variable bit rate non-real time) category flows and being adjusted as a function of the totalized mean bit rate and the n−1 other shapers being dedicated to the ABR and UBR category flows and being adjusted as a function of the available bit rate (AvCR) of the output ports.

BRIEF DESCRIPTION OF THE DRAWINGS

Other characteristics and advantages of the invention shall appear from the following description made with reference to the appended drawings, of which.

MORE DETAILED DESCRIPTION

Figure 4:
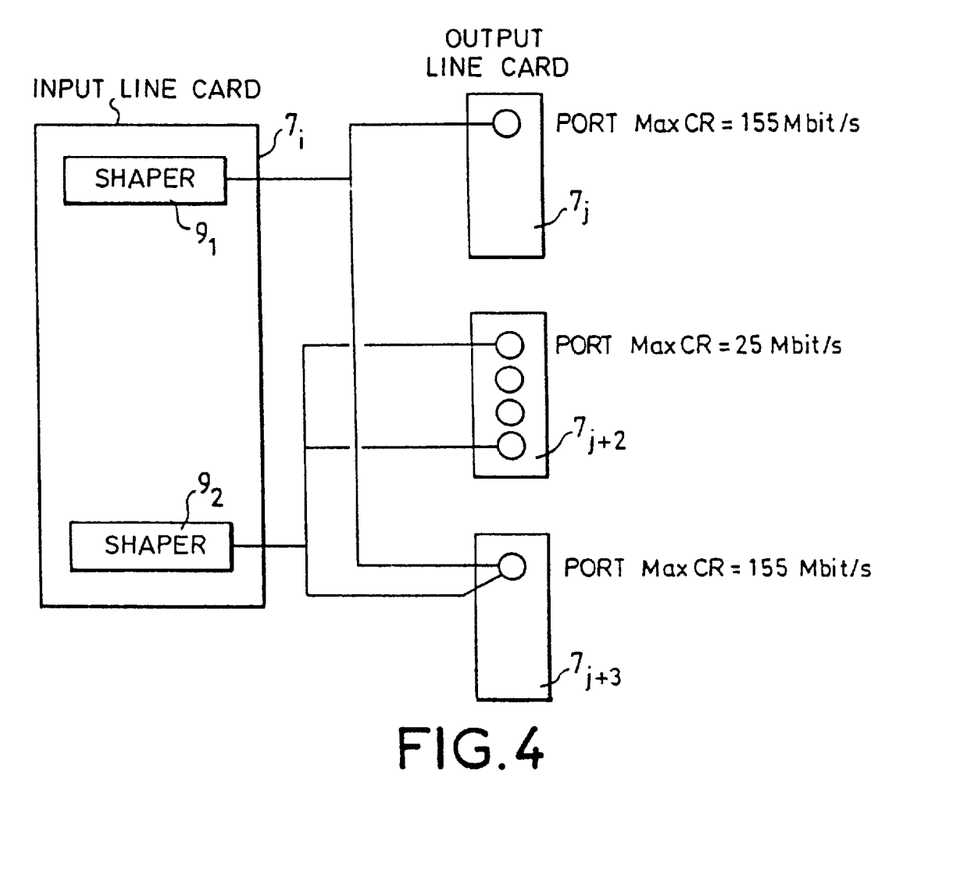
FIG. 4 is a drawing showing the principle of the assignment of trees to shapers according to the invention.

The method according to the invention overcomes the drawbacks of the prior art referred to here above in the case of point-to-multipoint connections. It does so by the implementation on each input line card $7_i$, in particular as shown in FIG. 4, no longer of one shaper but of several shapers $9_1$ to $9_n$. More specifically, a shaper is dedicated to real-time flows of the category VBRnrt. The bit rate of this shaper is adjusted as a function of the totalized mean bit rate of the VBRnrt flows. A fixed number n−1 of shapers dedicated to the UBR/ABR flow is adjusted as a function of the available rate (AvCR) of the output ports.

A range of operation is assigned to each of the UBR/ABR shapers identified by its number.

The ranges of operation characterize the bit rate values that a shaper may achieve. They are bit rate intervals (for example: 8 to 32 Mbit/s). The ranges of operation of the different shapers $9_1$ to $9_n$ are assigned definitively when the system is initialized and in such a way that the entire range of the nominal bit rates of the output ports is covered. The range of operation of a i+1 ranking shaper has a lower limit lower than the lower limit of the range of the i ranking shaper and an upper limit slightly higher than the lower limit of the range of the i ranking shaper so as to obtain a slight overlapping of the range of operation of the adjacent shapers.

For example, it is possible to envisage the following distribution in a switch whose output ports have nominal bit rates which are stepped in intervals from 64 kbit/s to 155 Mbit/s:

| number | range of operation |
|---|---|
| shaper 1 | 155 Mbit/s–8 Mbit/s |
| shaper 2 | 32 Mbit/s–2 Mbit/s |
| shaper 3 | 8 Mbit/s–64 kbit/s |

With each point-to-multipoint connection, there is associated a "tree" constituted by the data element of its input line card (root) and its output ports (leaves). (This terminology should not be confused with the previous terminology used in the prior art description where "root" and "leaf" are applied to users.) As and when the life of the connection progresses, the tree that is associated with it may get modified by the addition or elimination of leaves.

According to the invention, with each tree, there is associated a shaper which processes the cells of all the point-to-multipoint connections associated with this tree. The choice of the shaper is made as a function of the nominal bit rate of the "leaf" port having the lowest nominal bit rate, with a law of assignment that is within the scope o i f those skilled in the art. In the context of the above example, it may be decided that:

the trees for which all the "leaf" ports have a nominal bit rate of 155 Mbit/s shall be assigned to the shaper 1, the trees that do not come within the above category and of which no "leaf" port has a nominal bit rate, below 25 Mbit/s, will be assigned to the shaper 2, the trees that do not come under the above two categories will be assigned to the shaper 3.

In this way, each point-to-multipoint connection is assigned to a shaper, this assignment being revisable at each modification of the tree of the connection.

While the assignment of the connections to the shapers $9_1$ to $9_n$ is done as a function of the nominal bit rate of the leaves, the adjusting of the bit rate of the switches, on the contrary, is done as a function of the available bit rate of the leaves. The available bit rate is a difference between the nominal bit rate and the reserved bit rate. The concept of the reserved bit rate is one that depends on the implementation, which represents the totalizing of the bit rates guaranteed for the connections CBR, VBR, ABR and even UBR if the policy of the network means ensuring a minimum bit rate for the UBR connections. The bit rate of a shaper is computed by taking the minimum of the available bit rates of the leaves belonging to trees assigned to the shaper concerned. The precise implementation of a mechanism of this kind for adjusting the bit rates of shapers is within the scope of those skilled in the art. In the context of the above example, it may be assumed for example that the management module of the switch keeps the available bit rate of each output port up to date and that it periodically sends each input line card the bit rate to be applied to each of its shapers.

With regard to the shapers dedicated to the VBRnrt real time flows, these are adjusted as a function of the totalized mean bit rate of the connections concerned.

By the application of the above mechanism, following the major drop in the available bit rate on one or more output ports, the bit rate allocated to a rank i shaper could be incompatible with its range of operation. Thus, to avoid this situation, it is planned to have an exceptional mechanism by means of which those trees whose leaves are the ports concerned will be temporarily reassigned to a shaper adapted to lower bit rates, for example the i+1 rank shaper. Here the overlapping of the ranges of operation creates a natural hysteresis effect as a result of which the changes of assignment do not take place with excessive frequency and prevent excessively frequent changes of shapers for one and the same tree.

All the ABR/UBR shapers having the same number, located on different input line cards, are capable of sending cells simultaneously to one and the same output port, each at a bit rate lower than or equal to the available bit rate of this port. The result of this is that, in the worst case, the bit rate coming from the input line cards can easily go beyond the available bit rate of the concerned port. This problem is resolved by the implementation of a mechanism for the arbitration of access by the different line cards to the scrambling resource. This mechanism also makes it possible to overcome the prior art drawback, referred to, concerning the interleaving of the PDU application frames due to the AAL5 segmentation in the context of multipoint-to-point or multipoint-to-multipoint connections.

To do this, each of the ABR/UBR connection shapers arbitrates between two queues: a priority queue P1 which works in PDU application frame mode and a queue P2 which works in cell mode. To say that a queue works in PDU mode means that it is not ready to transmit unless it contains at least one full frame and unless the cells of one and the same frame are transmitted sequentially without any possibility for cells of other frames to get interposed. To say that a queue works in cell mode means that it is ready to transmit as soon as it contains at least one cell.

Then, on each input line card, the multipoint-to-point connections and multipoint-to-multipoint connections are assigned to trees, in a manner similar to that described for the point-to-multipoint connections. For the multipoint-to-point connections, the tree is reduced to its root and to a single leaf. For the multipoint-to-multipoint connections, the tree may take, as its root, the input line card considered and, as its leaves, all the ports taking part in the connection. The trees will be assigned to the shapers according to the same principles as those stipulated here above.

The multipoint-to-point connections and multipoint-to-multipoint connections use only the queues P1 for they run the risk of interlacing of the AAL5 PDUs.

Figure 5A:
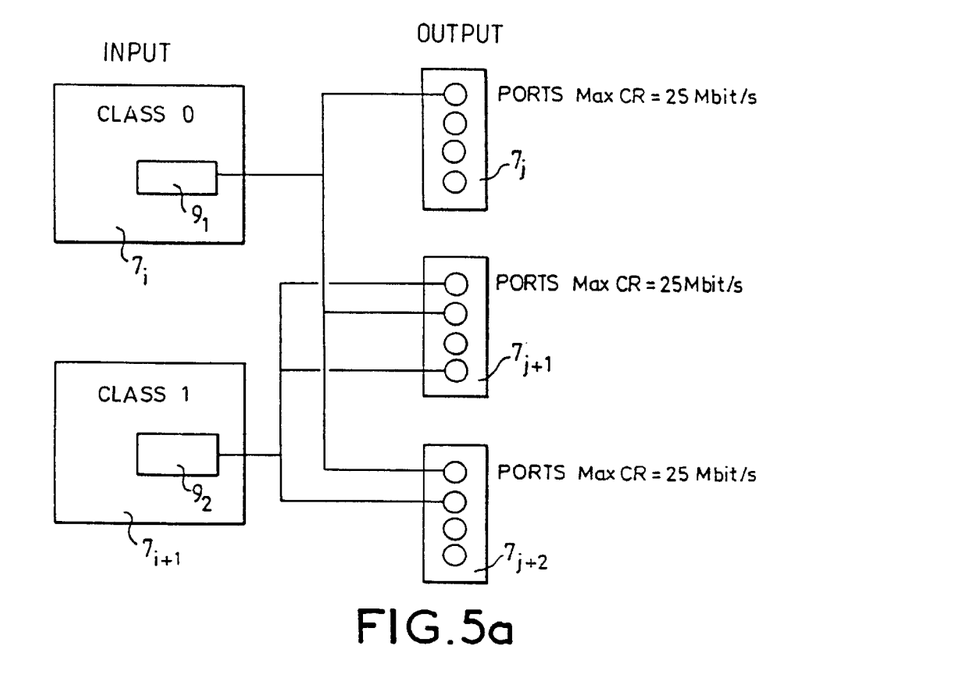
FIG. 5a shows an example illustrating an operation of the classifying of shapers according to the invention.

Each of the ABR/UBR shapers $9_1$ to $9_n$ of each line card $7_i$ is assigned to a class. There is a distribution into classes, namely a division of all the shapers of a given rank i. This division is different for each rank of shaper, namely for each range of operation. The classes are defined by the following principle: in a given range of operation, a shaper of this range is in the same class as another shaper of this range if at least one tree associated with the first shaper and at least one tree associated with the second shaper has at least one common leaf. Conversely, two shapers are in different classes, as can be seen in FIG. 5a, if all the leaves of the trees associated with one of them has a vacant intersection with all the leaves of the trees associated with the other shaper. It must be noted that this division is dynamic: the assignment of a new tree to a shaper or its elimination will generally require the recomputation of the division. Each division comprises at least one class and, at most, as many classes as there are line cards in the switch.

The algorithm for the classification of the shapers according to the principle stipulated here above is within the scope of those skilled in the art.

The principle of arbitration is based on a division of time into n intervals with a length T=T1=T2=T3. An "order of speaking" is assigned to the various shapers of the same class. At each time interval T, the shaper of each class that has the "right to speak" and can begin sending the cells of a PDU extracted from the file P1 during the interval T1. During the interval T2, it may continue to send the cells of a PDU whose transmission has already begun but it cannot start sending a new PDU. This same shaper may send cells coming from P2 throughout the duration of the interval T1=T2, provided of course that it is incapable of sending cells coming from P1 (according to the principle of priority of P1 over P2). If its transmission ends before the end of T1=T2, a shaper may hand over the right to speak to another shaper of its class which itself could make transmission during the same period. Once the interval T1=T2 has elapsed, each line card indicates its desire to send a message by means of a collecting mechanism that runs in the interval T3. The "turn to speak" during the interval T will also be computed as a function of wishes expressed and in favoring a shaper that has had to suspend the transmission of a PDU before the end of this PDU. The algorithm for computing the "turn to speaker" must ensure a certain fairness between the line cards if the management policy of the switch requires it. An algorithm of this kind is within the scope of those skilled in the art. All that is said here above pertains to a given rank i of a shaper. Thus, for example, the intervals T, T1, T2, T3 depend on i, namely on the range of operations of the shaper considered.

An implementation of the above principles based on tokens is described hereinafter by way of an example. Different phases of this mechanism shown in FIGS. 5b, 5c and 5d are described.

The tokens have specialized cells exchanged with the different line cards $7_i$, on the initiative of a master unit which may be one of the line cards $7_i$ or else the management module 4 or else the switch fabric 2 itself. The invention distinguishes three types of token.

Figure 5B:
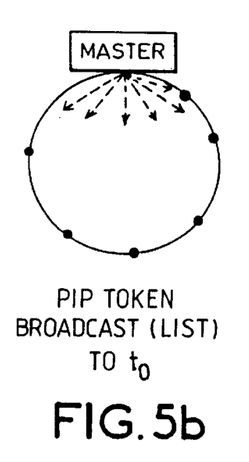
FIGS. 5b, 5c, and 5d show examples of the broadcasting of tokens according to the invention.

The "SYNC SIGNAL token" of FIG. 5b is sent periodically by the master unit with a periodicity T, in a general broadcast to all the line cards whose i rank shaper possesses at least one tree that is associated with it. This token is used for the approximate synchronizing of the transmissions between the different line cards. It also conveys the "turn to speak" for each class.

Figure 5C:
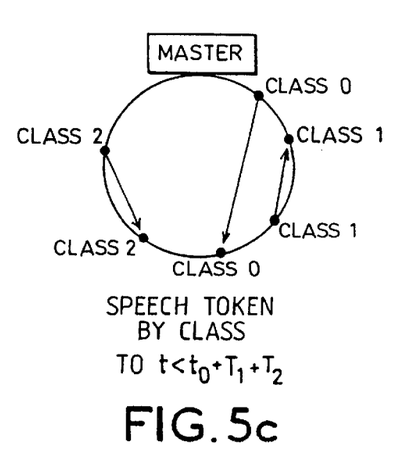
Figure 5D:
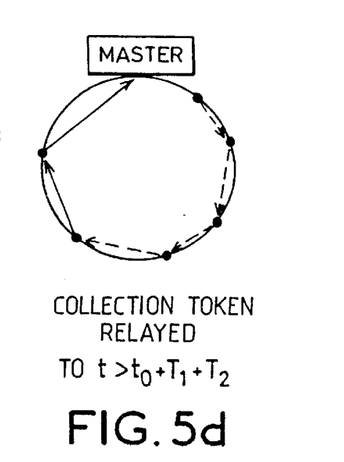

The "SPEECH token" of FIG. 5c is specific to each of the classes identified here above. It is sent by one of the line cards whose rank i shaper has finished the transmission to the next line card, before the end of the interval T1+T2, of the "turn to speak" within the class considered.

The "COLLECTION token" of FIG. 5d is sent by one of the line cards that has received the SYNC SIGNAL token at the end of the period T. It is relayed from one unit to the next in all the concerned line cards which record an indicator therein on their need to make transmission during the following period or to continue to transmit the end of a PDU whose transmission has already started. Finally, the token is received and processed by the master unit.

To overcome the prior art drawback concerning the case of broadcasting servers, such as BUS servers, made by the superimposition of point-to-point connections of each user of a broadcasting group towards the server and a point-to-multipoint connection of the server towards all the users of the same group, a short-circuit is made within the ATM switch between the different connections. This enables the creation of a multipoint-to-multipoint type communication in which the relaying of the PDU application frames is done totally by the junction devices, the server no longer having any role other than that of the management of the broadcasting groups, namely the operations needed for the arrival of a new user in the group or the departure of a user from a group. The process of relaying PDU frames at the level of the line cards is made possible by the implementation of the arbitration and flow control processes described here above.

Figure 6A:
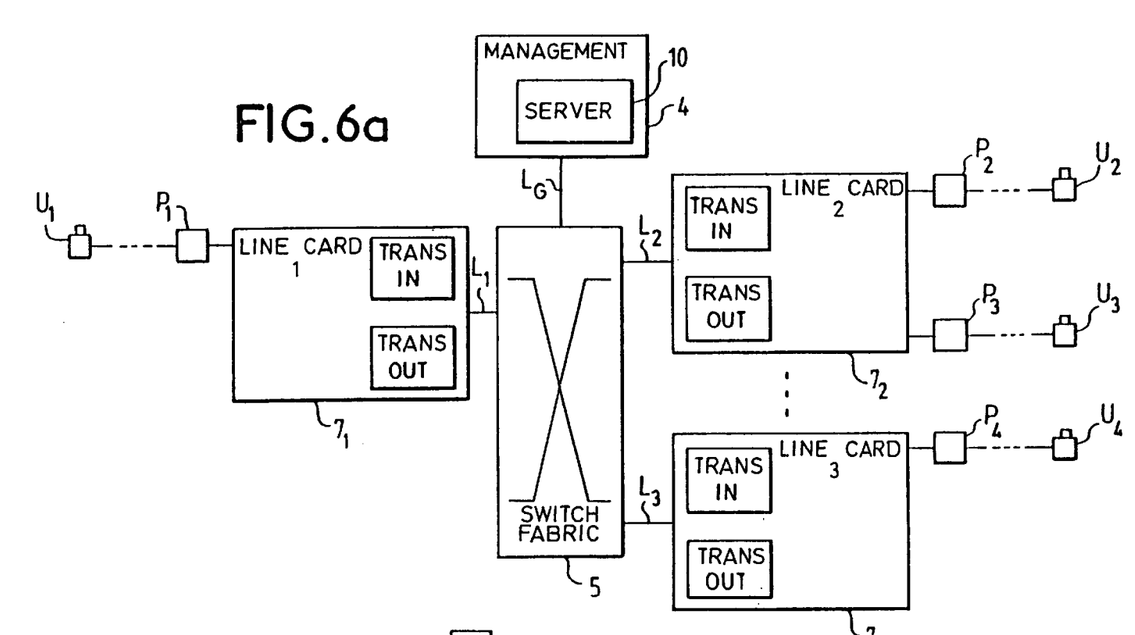
FIGS. 6a to 6d show examples of implementation of a broadcasting server according to the invention.

The broadcasting server which bears the reference 10 in FIG. 6a is a software process that is executed on the management module 4 of the switch. In the prior art mode of operation, the communications module is the one shown in FIG. 6b which illustrates the example of three users belonging to one broadcasting group. In the mode of operation according to the invention, the communications module is the one shown in FIG. 6c in which the point-to-point connections A1, A2, A3 and the point-to-multipoint connection M are replaced by point-to-multipoint connections B1, B2, B3 from each user of the group towards all the others.

This modification of the communications module is made possible by a simple conversion of the input and output translations implemented in the ATM layer and referenced TRANS IN, TRANS OUT in the line cards $7_1$, $7_2$, $7_3$ of FIG. 6a. With regard to the input translations of the Ai type point-to-point connections, they are, in the prior art. VLAi→(VLA'i,LG) where VLAi is a logic path identifier associated with Ai on the input artery, VLA'i is the identifier associated with this same connection in the management module and LG is the identity of the switch fabric junction of the management module. This expresses the fact that all the PDU frames are processed by the server in the implementation module. Conversely, all the frames retransmitted by the server to the users of a given broadcasting group are sent with a logic channel VLM characteristic of the point-to-multipoint connection M. An output translation makes it possible, in each output line card concerned, to convert the broadcasting index VLM into a logic channel identifier VLMi characteristic of this connection on the output artery with a possible copying of each cell if it must exit at several ports P1, P2, . . . Pp. This last-named translation therefore has the form VLM→(VLMP1,P1), (VLMP2,P2), . . . , (VLMPp,Pp).

According to the invention, the only translations modified by the short-circuit are the input translations which become VLAi→(VLM,L1,L2,L3, . . . ,Lq) where L1 to Lq designate all the switch fabric junctions concerned by the connection M.

In the mode of operation according to the invention, the broadcasting server manages the arrival and departure of the users in the same way as in the prior art and then determines the input translations to be modified in order to arrive at the communications module described here above.

Figure 6B:
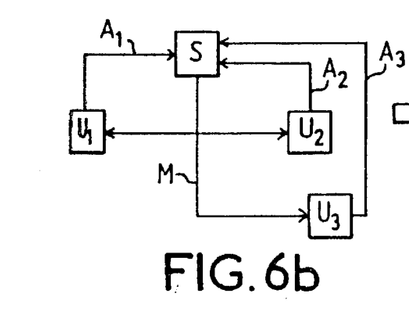
Figure 6C:
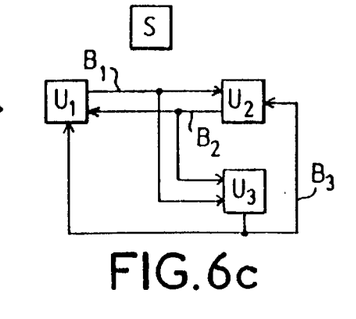
Figure 6D:
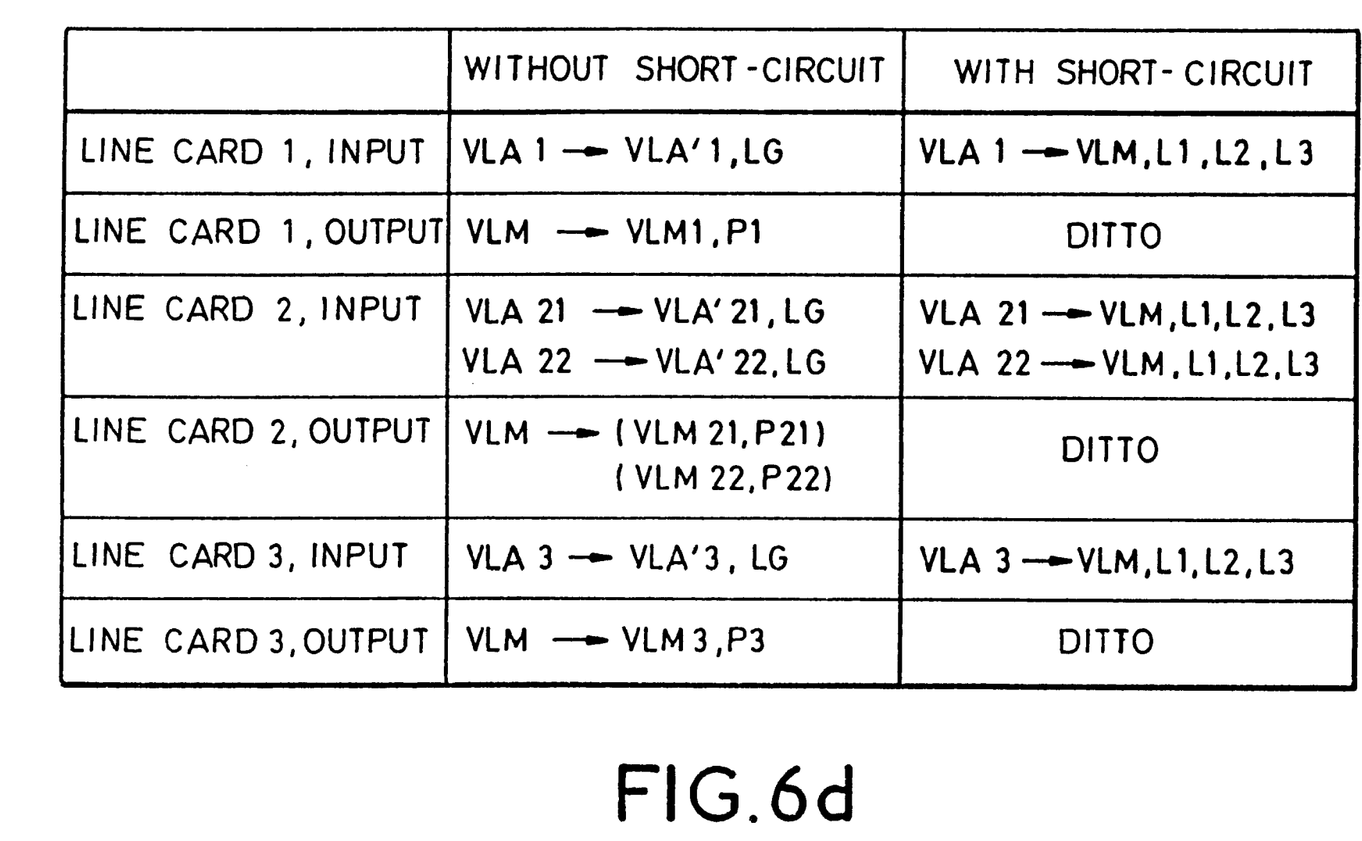

The table of FIG. 6d shows an exemplary translation with and without short-circuits in the case of a broadcasting group comprising four users ui, u21, u22 and u3 as indicated in FIG. 6a.

Note 1: without being exhaustive, FIG. 6b represents a case where the connections A1, A2, A3 are one-way connections which is not the case for the LANE server BUS.

Note 2: the connections A1, A2, A3 and M continue to exist at least with regard to the signalling.

Note 3: depending on the applications, it is always possible that the server itself may or may not be considered to form part of the group of users.

Finally, in addition to the arbitrating mechanism described here above, it is possible to have a third mechanism that makes it possible to overcome the prior art drawback referred to here above if a frame router IP is implemented in a management module. The method makes it possible, within the ATM switch, to obtain a real decentralization of the relay function IP by limiting the role of the router to the computation of the routes (prior art).

Figure 3C:
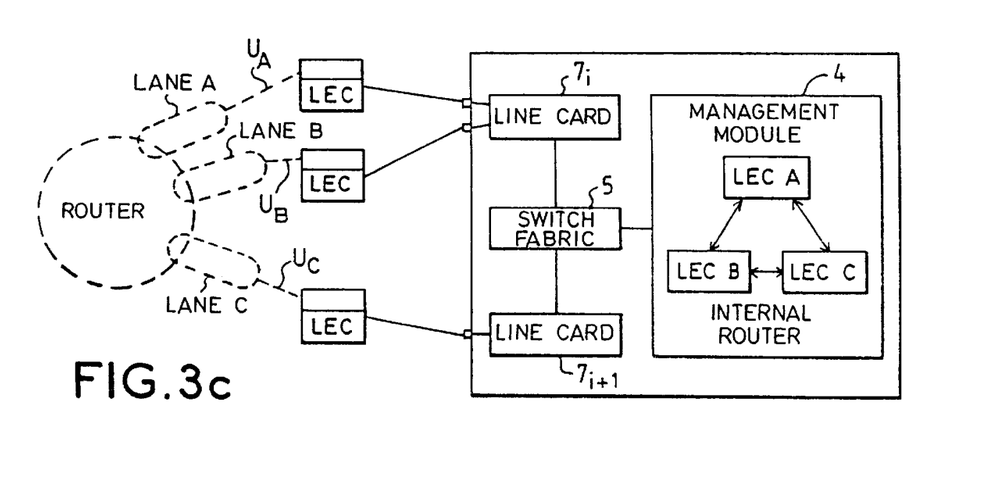
FIG. 3c is a drawing showing the principle of routing between ELANs.
Figure 3D:
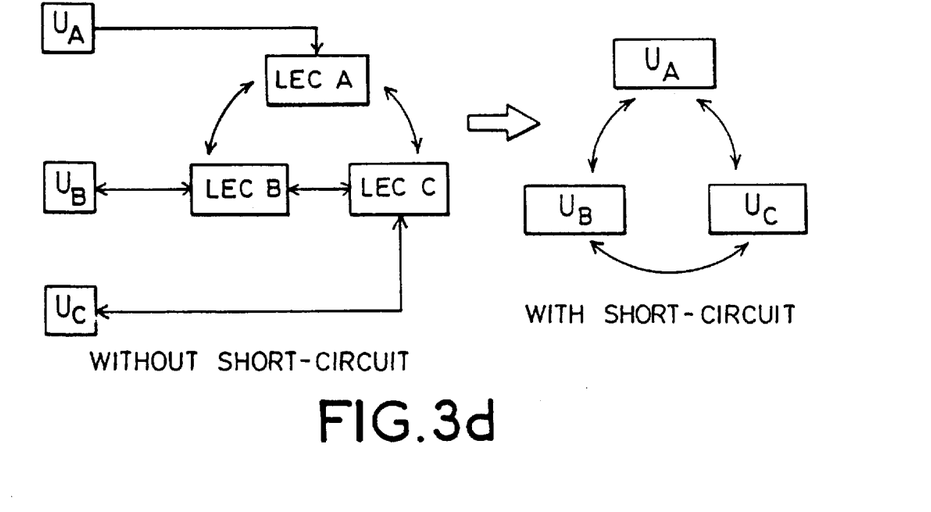
FIG. 3d shows a principle of short-circuit implemented by the invention.

FIG. 3c shows a case where this method can be used. The internal router has as many LECs as there are ELANs known to it. If the user uA belonging to the ELAN A wishes to send a frame IP to the user uB, he starts by using the broadcasting means on the emulator ELAN (BUS broadcasting server). If the router function internal to the switch knows about the existence of the user uB, the function LEC A of this router, associated with the ELAN A emulation, declares itself to be the addressee of all the IP frames addressed to the user uB. Thereafter, the user uA uses his direct ATM connection to perform the LEC A function, according to usual procedures specified in the LANE standard for sending frames to the user uB. In the prior art, the frames must go back up to the internal router at the management module in order to be relayed towards the user uB through the use of the direct ATM connection existing between the LEC B function and the user uB.

The method according to the invention specifies that, for any PDU application frame arriving at a direct connection relating to the LEC A function, the input line card examines its first cell and extracts the IP address of the addressee therefrom. It then travels through a cache table updated by means of routing information coming from the management module and there, before the IP address, it finds a pair (logic channel, outgoing direction). The logic channel is the one used by the direct connection between the LEC B and uB. The outgoing direction is the identifier of the switch fabric junction concerned by this direction connection. If the input line card does not find the IP address sought in the cache table, it sends the management module a request for updating the cache. The information found in the table is then used for the translation of the ATM header of each cell of the PDU concerned. Thus, a dynamic translation is obtained, the translation table being modified potentially during the passage of each PDU. Thus, a "dynamic short-circuit" is set up between two point-to-point connections.

What is claimed is:

1. A method for utilizing an ATM switch with distributed architecture and storage at input to control flows within the ATM switch, the ATM switch including input line cards and output ports connected to respective of the input line cards, the method comprising:

distributing, to each of the input line cards, a specified number n of shapers, one shaper being dedicated to a VBRnrt (variable bit rate non-real time) category flow and being adjusted as a function of a totalized mean bit rate of the VBRnrt category flow, and n−1 other shapers being dedicated to ABR (Available Bit Rate) and UBR (Unspecified Bit Rate) category flows;

associating, with each ABR and UBR connection, a tree whose root is constituted by its respective input line card and whose leave are constituted by respective of the output ports;

assigning each tree to one of the n shapers chosen as a function of the nominal bit rate of the leaves of the tree being assigned, the chosen shaper being adjusted as a function of the available bit rate of the leaves of all the trees assigned to the chosen shaper.

2. A method according to claim 1, further comprising assigning, to each shaper, a first queue working in PDU application frame mode and a second queue working in cell mode.

3. A method according to claim 2, further comprising reserving the first queue to multipoint-to-point and multipoint-to-multipoint connections.

4. A method according to claim 1, further comprising assigning each shaper to a class defined by each respective shaperts range of operation, a respective shaper of a range being in the same class as another respective shaper if the respective trees associated with each of the respective shapers has at least one common leaf.

5. A method according to claim 4, further comprising assigning an order of speaking to the shapers of one and the same class, limiting a right to speak to within a specified time interval T, divided into three elementary time intervals $T_1$, $T_2$, $T_3$ such that $T=T_1+T_2+T_3$, the beginning of a transmission starting in the interval $T_1$, the end of a transmission taking place in the interval $T_1+T_2$, the turn to speak in the next interval T being determined as a function of wishes expressed by each shaper during the interval $T_3$ in favoring the shaper that has suspended a transmission of a PDU application frame.

6. A method according to claim 5, further comprising designating a master line card for the transmission of a SYNC SIGNAL token with a periodicity T, in a general broadcast to all the line cards with a shaper of rank i, in which i is an integer, that possesses at least one tree that is associated with the shaper of rank i, bringing about the transmission of a speech token by one of the line cards whose shaper of rank i has finished transmitting before the end of the interval T1+T2 to a next line card with the turn to speak in the class considered and in bringing about the transmission, by the line card that has received the SYNC SIGNAL token at the end of the period T during the time interval $T_3$, of a collection token towards the master line card in which indicator is recorded indicating a need to transmit during the following time interval T.

7. A method according to claim 6, further comprising carrying out communications in multipoint-to-multipoint mode by shifting a frame relaying function of a broadcasting server in an ATM layer of line cards by modification of input translations of point-to-point connections (Ai), which go from VLAi→(VLA'i, LG) to VLAi→(VLM,L1,L2,L3, . . . , Lq), where VLAi designates a logic channel identifier associated with (Ai) on an input artery, VLA'i designates a logic channel identifier associated with a same connection in a management module, LG designates an identity of a switch fabric junction of a management module, VLM designates a broadcasting index of the point-to-multipoint connection M, and L1, L2, . . . , Lq designate an identity of switch fabric functions concerned by the connection M.

8. A method according to claim 6, further comprising carrying out communication in multipoint-to-multipoint mode by shifting a frame relaying function of a routing emulation device in an ATM layer of the line cards by an examination of a first cell of each PDU frame to extract an IP address of an addressee therefrom, by making a search in a cache table of a pair formed by a logic channel and an outgoing direction before the extracted IP address, and using a translation obtained in all the cells of the PDU frame, the cache table being updated by routing information coming from a routing emulation function that resides in a management module and in transmitting a request for updating of the cache table if the desired IP address is not therein.

9. A method for controlling flow within an ATM switch with distributed architecture and storage at input, the ATM switch including input line cards and output ports connected to respective of the input line cards, the method comprising:

controlling the flow by:

distributing, to each of the input line cards, a specified number n of shapers, one shaper being dedicated to a VBRnrt (variable bit rate non-real time) category flow and being adjusted as a function of a totalized mean bit rate of the VBRnrt category flow, and n−1 other shapers being dedicated to ABR (Available Bit Rate) and UBR (Unspecified Bit Rate) category flows;

associating, with each ABR and UBR connection, a tree whose root is constituted by its respective input line card and whose leaves are constituted by respective of the output ports;

assigning each tree to one of the n shapers chosen as a function of the nominal bit rate of the leaves of the tree being assigned, the chosen shaper being adjusted as a function of the available bit rate of the leaves of all the trees assigned to the chosen shaper.

10. A method according to claim 9, further comprising assigning, to each shaper, a first queue working in PDU application frame mode and a second queue working in cell mode.

11. A method according to claim 10, further comprising reserving the first queue to multipoint-to-point and multipoint-to-multipoint connections.

12. A method according to claim 9, further comprising assigning each shaper to a class defined by each respective shaper's range of operation, a respective shaper of a range being in the same class as another respective shaper if the respective trees associated with each of the respective shapers has at least one common leaf.

13. A method according to claim 12, further comprising assigning an order of speaking to the shapers of one and the same class, limiting a right to speak to within a specified time interval T, divided into three elementary time intervals $T_1$, $T_2$, $T_3$ such that $T=T_1+T_2+T_3$, the beginning of a transmission starting in the interval $T_1$, the end of a transmission taking place in the interval $T_1+T_2$, the turn to speak in the next interval T being determined as a function of wishes expressed by each shaper during the interval $T_3$ in favoring the shaper that has suspended a transmission of a PDU application frame.

14. A method according to claim 13, further comprising designating a master line card for the transmission of a SYNC SIGNAL token with a periodicity T, in a general broadcast to all the line cards with a shaper of rank i, in which i is an integer, that possesses at least one tree that is associated with the shaper of rank i, bringing about the transmission of a speech token by one of the line cards whose shaper of rank i has finished transmitting before the end of the interval T1+T2 to a next line card with the turn to speak in the class considered and in bringing about the transmission, by the line card that has received the SYNC SIGNAL token at the end of the period T during the time interval $T_3$, of a collection token towards the master line card in which indicator is recorded indicating a need to transmit during the following time interval T.

15. A method according to claim 14, further comprising carrying out communications in multipoint-to-multipoint mode by shifting a frame relaying function of a broadcasting server in an ATM layer of line cards by modification of input translations of point-to-point connections (Ai), which go from VLAi→(VLA'i, LG) to VLAi→(VLM,L1,L2,L3, . . . , Lq), where VLAi designates a logic channel identifier associated with (Ai) on an input artery, VLA'i designates a logic channel identifier associated with a same connection in a management module, LG designates an identity of a switch fabric junction of a management module, VLM designates a broadcasting index of the point-to-multipoint connection M, and L1, L2, . . . , Lq designate an identity of switch fabric functions concerned by the connection M.

16. A method according to claim 14, further comprising carrying out communications in multipoint-to-multipoint mode by shifting the frame relaying function of a routing emulation device in an ATM layer of the line cards by an examination of a first cell of each PDU frame to extract the IP address of the addressee therefrom, by making a search in a cache table of a pair formed by a logic channel and an outgoing direction before the extracted IP address, and using the translation obtained in all the cells of the PDU frame, the cache table being updated by routing information coming from a routing emulation function that resides in the management module and in transmitting a request for updating of the cache to a management module if the desired IP address is not therein.

\* \* \* \* \*